United States Patent [19]

Yamada et al.

[11] Patent Number: 4,553,172

[45] Date of Patent: Nov. 12, 1985

[54] PICTURE SCANNING AND RECORDING METHOD

[75] Inventors: Mitsuhiko Yamada; Toshiaki Nakade, both of Kyoto, Japan

[73] Assignee: Dainippon Screen Mfg. Co., Ltd., Kyoto, Japan

[21] Appl. No.: 471,869

[22] Filed: Mar. 3, 1983

[30] Foreign Application Priority Data

Mar. 13, 1982 [JP] Japan .................................. 57-39877

[51] Int. Cl.[4] ............................................. H04N 1/40
[52] U.S. Cl. ..................................... 358/280; 358/283; 358/284; 358/75; 358/78; 358/296; 358/298
[58] Field of Search ............... 358/283, 280, 282, 284, 358/75, 80, 78, 296, 302, 183, 283, 285; 364/518, 523

[56] References Cited

U.S. PATENT DOCUMENTS

| | | | |
|---|---|---|---|
| 4,149,183 | 4/1979 | Pellar et al. | 358/75 |
| 4,151,562 | 4/1979 | Tregay | 358/263 |
| 4,467,363 | 8/1984 | Tench, Jr. | 364/523 |
| 4,475,162 | 10/1984 | Kitamura | 364/518 |

FOREIGN PATENT DOCUMENTS

| | | |
|---|---|---|
| 52-33523 | 8/1977 | Japan . |
| 56-31273 | 3/1981 | Japan . |
| 56-55841 | 10/1982 | Japan . |

Primary Examiner—Howard W. Britton
Assistant Examiner—Victor R. Kostak
Attorney, Agent, or Firm—Brumbaugh, Graves, Donohue & Raymond

[57] ABSTRACT

In scanning and recording an original picture and a character document so as to produce a reproduce synthesized from said picture and said document, picture signals and character signals both generated by the scanning are arranged in data formats of the same word length. Each character signal is caused to correspond to plural fine picture elements that are defined by finely dividing one picture element of the original picture so that the characters may be processed with a resolving power higher than that for said picture. The data formats include a discrimination signal by which the picture signals are selected to be output only when the character signals do not exist in processing circuit.

7 Claims, 9 Drawing Figures

PICTURE SCANNING AND RECORDING METHOD

BACKGROUND OF THE INVENTION

The invention relates to a method utilized in a photomechanical scanner or the like for scanning and recording an original picture, and more particularly to such a method that is adapted to produce synthesized duplicates of said picture by means of two kinds of digital signals, one of them being a series of signals representing the picture of continuous tone while the other representing letters or characters of discontinuous binary tone such as white and black.

The picture scanning and recording apparatuses generally should have some kinds of editing functions. For example, a plurality of original pictures are to be recorded on a single photosensitive material in accordance with a predetermined layout. Further in the other cases, a continuous tone picture and a letter or figure with binary tone are synthesized to give a duplicate of desired layout. The letters or characters consist of fine and short lines giving binary electronic signals when they are scanned. A higher resolving power is therefore needed in scanning the letters or characters than in scanning the pictures. If, however, the higher resolving power were applied also to the picture of continuous tone, the overall processing time whould become much longer than that theoretically needed. This is an undesirable disadvantage for the abovesaid apparatus and method. Furthermore, such excessive power would also need an excessively large capacity of memory devices such as magnetic discs that are usually utilized in processing and layout operation of the electronic data produced for the above picture and the letters. The processing time would become increasingly longer because of such excessive capacity of said memory devices.

BRIEF SUMMARY OF THE INVENTION

An object of the invention is therefore to provide a method for duplication of image synthesized from an original picture and letters by utilizing only a memory device of comparatively small capacity.

Another object of the invention is to provide a method in which the picture and the letters are processed at the same time in such a manner that to the letters or characters a resolving power is applied which is higher than that applied to the picture.

Still another object of the invention is to provide an image duplication method which makes it possible to color the letters in duplicates integrated with the original picture and/or to vary the gradation of each fine halftone dot (hereinafter called "dot gradation ratio") constituting said letters wherein any desired color and-/or any desired area ratio or percentage for halftone process can be selected.

According to the invention, an original picture and a character document are photoelectrically scanned at the same time to produce in parallel to each other two series or sequences of electric signals respectively representing fine portions of said picture and said document. The picture signals and the character signals are then supplied to a priority processing circuit for the character signals, hence only the latter signals are processed to the next processing step when they enter the circuit simultaneously with the former signals, i.e. the graphic signals originating from the original picture. It is noted however that the graphic signals will be processed from the circuit if only they enter it without accompanying the character signals. In other words, electric signals from portions of the picture to be superimposed on the letters are thus interrupted by the preference circuit and do not advance to the next step.

The graphic signals generated from the circuit are then fed to a dot formation circuit which converts them into halftone image signals. These halftone signals and the preferentially generated character signals cooperatively control exposure beams of light on the recording device of the apparatus used in conducting the invented method. Thus, a halftone image is produced on each reproduction, the letter portions of the reproduced images thereby being colored with 100 or less percentage of dot gradation ratio.

In the invention, the abovesaid graphic signals and the character signals are converted into regular data having data formats which are of the same word length and comprise a classification bit utilized for discriminating the kinds or sorts of each converted data. Therefore, these two kinds of signals, i.e. graphic signals and character signals, can be processed in a parallel operation mode. This in turn remarkably reduces the memory capacity which would be otherwise much larger in the known methods. In other words, the invention provides a real time system for the integral reproduction of the original picture and the letters or characters that are to be combined with the former.

Another important feature of the invention resides in its scanning system in which said original picture is scanned according to predetermined scanning lines whose pitch is substantially the same as those for scanning the letters wherein a single photosensor is used for scanning the picture while plural photosensors are used in scanning the letters or characters to thereby improve the resolving power with regard to the character document. In response to such a high resolving power on the input side of the system, the output side or section of the system is also provided with a high resolving power by using plural exposure beams of light. It will now be appreciated that the letters or characters can be scanned in a short time that has previously been sufficient only for the picture scanning, without deteriorating the resolving power.

Other objects and advantages will become apparent in the following description of a preferred embodiment shown in the drawings.

DETAILED DESCRIPTION OF THE INVENTION

Figure 1:
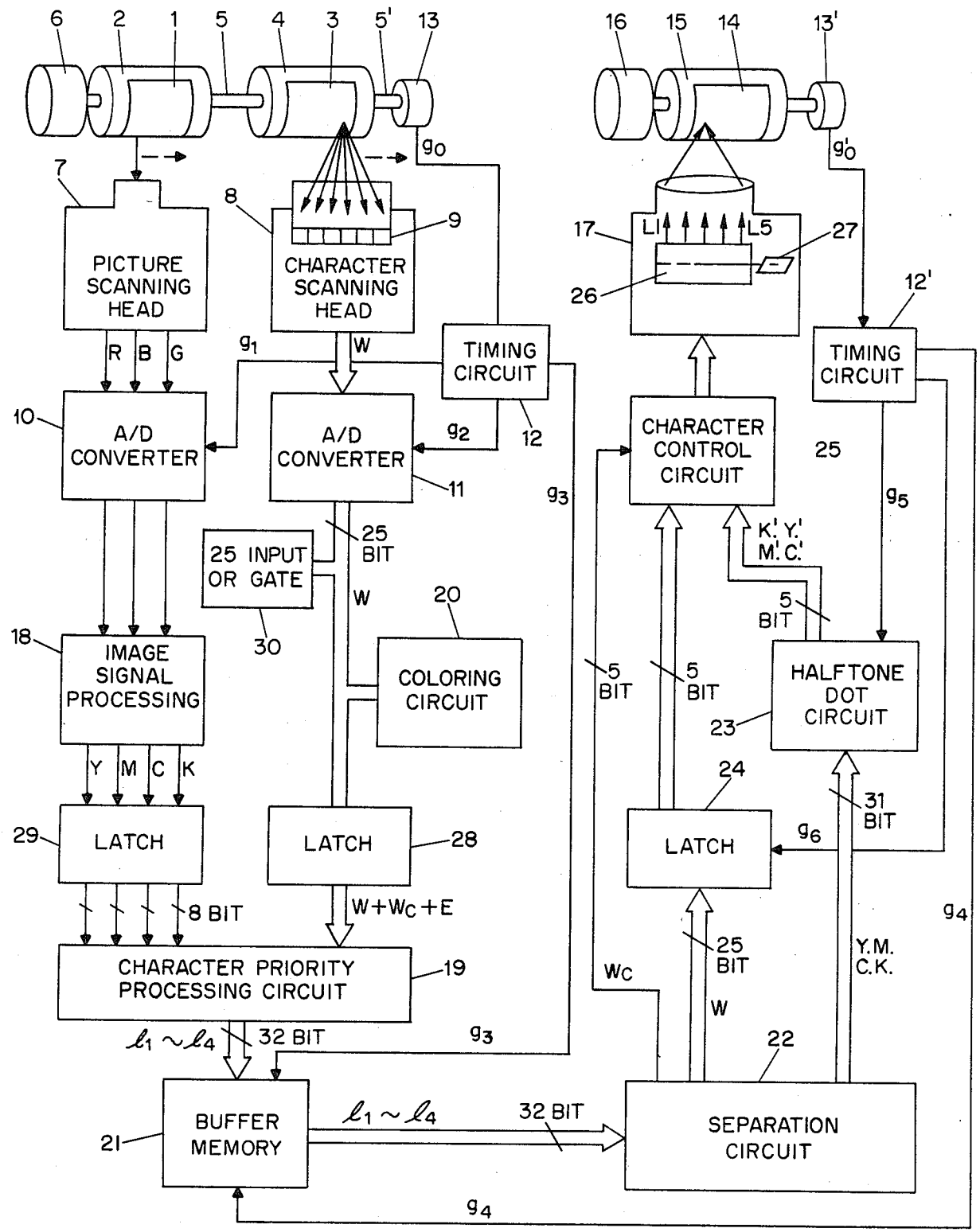
FIG. 1 of the drawings is a block diagram schematically illustrating a color scanner adapted to conduct an embodiment of the invention.

Referring now to FIG. 1, a color scanner shown therein is capable of simultaneously separating four colors. An original picture 1 is set on a drum 2 that is connected by a shaft 5 to another drum 4 which has a character document 3 attached thereon, both the drums 2, 4 being thereby driven to synchronously rotate by means of a motor 6.

A scanning head 7 for the picture 1 is arranged at a position facing said drum 2 whilst another scanning head 8 is arranged to face the other drum 4. These heads 7, 8 are combined in such a manner that they maintain a predetermined distance therebetween while they move synchronously with each other in a subsidiary scan direction (shown with broken arrows) in parallel to said drums. The character document 3 is scanned by a fine spot light of the same diameter as that for scanning the original picture 1. A beam of light reflected on the picture 1 is received by the head 7 and converted therein into three color separated picture signals R(red), G(green) and B(blue). On the other hand, beams of light reflected on the document 3 are respectively received by, for example, five photosensors 9 of the other scan head 8. For instance, the five photosensors are arranged on a line in parallel to the abovesaid subsidiary scan direction. It is to be noted that a single beam of light incident on the document 3 is reflected to be sensed by the photosensors 9 so as to produce plural character signals W. A resolving power applied to the character document 3 is therefore higher than that applied to the original picture 1.

The color separated picture signals R, G and B are digitized by an analog-digital (A/D) convertor 10 at a sampling pitch or pulse greater than that which is finely divided in digitizing the character signals W by the other A/D convertor 11. This also contributes to the higher resolving power for the character document 3.

Figure 2:
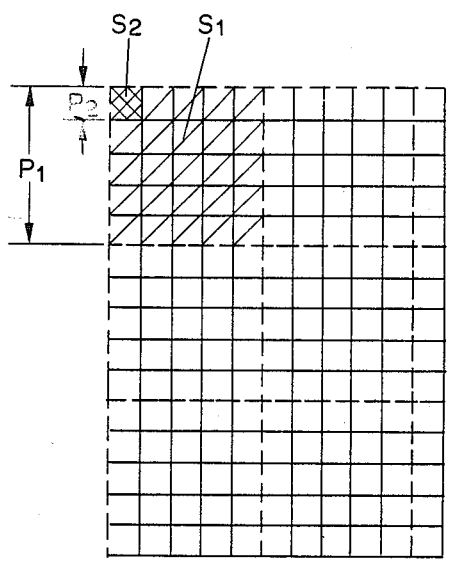
FIG. 2 schematically shows arrangements of pictorial elements $P_1$ and $P_2$ respectively constituting an original picture and a character document.
Figure 3:
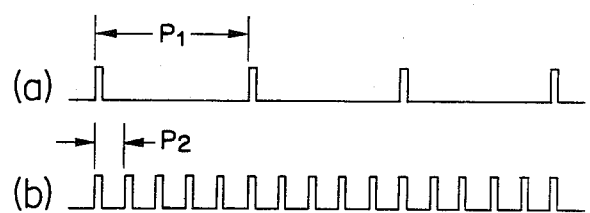
FIG. 3 indicates a timechart (a) as well as another timechart (b), the former being for sampling pulses used in scanning the picture while the latter being for those used in scanning the character document.

FIG. 2 shows a relation between the picture element pitches $P_1$ of the picture and the picture element pitches $P_2$ of the document in a case where the character signals are digitized by a sampling pitch five times as great as that of the picture signals. FIG. 3 indicates a series (a) of sampling pulses $g_1$ that are generated at a timing circuit 12 and are given to the A/D convertor 10 for picture signals. Another series (b) of sampling pulses $g_2$ for character signals are also indicated in FIG. 3 in comparison with the series (a), said pulses $g_2$ being similarly generated at the circuit 12 and given to the other convertor 11. In the exemplified case, one element $S_1$ of the picture is equal to twenty five (5×5) elements $S_2$ of the document. This means that the document 3 is scanned with a higher resolving power in a short period of time of the same length as that in scanning the picture 1. The above sampling pulses $g_1$, $g_2$ are generated in the timing circuit 12 by means of raw pulses $g_o$, which in turn are generated at a rotary encoder 13 driven by a drum shaft 5' synchronously with the aforementioned drums 2, 4.

In the recording section, a film 14 is set on a recording drum 15 driven by another motor 16 at a synchronous speed with the drums 2, 4 of the scanning section. An exposure head 17 moves in subsidiary scan direction synchronously with the scan heads 7, 8, the direction being in parallel with the surface of said recording drum 15.

If it is required to combine some original pictures into a whole in a reproduction, the method disclosed in the Japanese Early Publication Gazette (patent) Sho. 56-31273 will be advantageously utilized whereby said pictures are set on the drum 2 and then scanned and reproduced in a single reproduction, each of them being enlarged at any ratio of magnification. A character document can also be incorporated into a desirable portion of such an integrated reproduction by means of coordinated signals added by a digitizer to character signals. It is also possible to magnify the characters.

The exposure head 17 has such a structure as to project plural exposing beams of light $L_1$ to $L_5$ in accord with the high resolving power of the scanning section, the beams as a whole exposing each of the fine spots on the film corresponding to each picture element of the original picture. The number of exposing beams is in this example the same, i.e. five, as that of the photosensors 9 built in the head 8 scanning the character document 3. These beams $L_1$ to $L_5$ are aligned with each other so as to be controlled respectively by one-bit character control signals, thus each picture element being divisionally exposed by five beams. It will be apparent that each of the areas exposed by beams $L_1$ to $L_5$ respectively corresponds to each of the elements $S_2$ on the document so that character images are produced on the film with a resolving power much higher than that applied to picture images also produced on said film.

Returning now to the scanning section, the picture signals R, G and B are transmitted from the A/D convertor 10 to an image signal processing circuit 18 where necessary treatments such as color correction, tone correction and detail emphasizing are applied to said signals R, G and B. Thus, color-corrected image signals Y, M, C and K are generated from the circuit 18, these respectively corresponding to those data for making the yellow, magenta, cyan and black separations utilized in a usual color printing system. A latch 29 will latch the above image signals Y, M, C and K, each being for example an eight-bits signal, to thereby convert them into a picture image signal of thirty two-bits (32 bits) length for each picture element $P_1$. The thirty two-bits signal is then fed to a character priority processing circuit 19.

The character signals W which consist of five-bits signals sequentially generated from the A/D convertor 11 are, on the other hand, latched by another latch circuit 28 so that they are arranged as twenty five-bits (25 bits) character image signals which can be reasonably compared with the abovesaid thirty two-bits picture signals. Namely, each picture element on the character document is represented by the respective twenty five-bits signals to which color designate signals $W_c$ of six-bits length are respectively added by a coloring circuit 20. The circuit 20 comprises digital switches that are to be operated to set a desired color which should be given to character images reproduced on the film. A discrimination signal E is also added to each of the twenty five-bits character signals. The discrimination signal of one-bit length may be produced by charging all the twenty five bits of the signal W into an OR-gate 30 in parallel with each other. If one or more of said bits are at high level "1", said one-bit signal E as an output of said gate will obtain the high level "1". The character priority processing circuit 19 will thus transmit therethrough the character signal latched in a latch 28 and consisting of 32 bits allotted to the raw character signal W, the color designate signal $W_c$ and the discrimination signal E when the latter signal E is at its high level "1".

The character priority processing circuit 19 has a structure such that when the picture signal and the character signal enter it a part, i.e. the signal E, of the latter prevents the former from going out of it if the signal E is at the high level "1". However, the picture signal will be generated from the circuit when the signal E is at low level "0". Thus, output signals from the priority processing circuit 19 are then sent to a buffer memory 21 where they are sequentially written thereinto to form a number of data having a word length of 32 bits. The length corresponds to one picture element and is controlled by write command pulses $g_3$ supplied from the aforementioned timing circuit 12. Such data are written on the predetermined addresses in a sequence.

Figure 4:
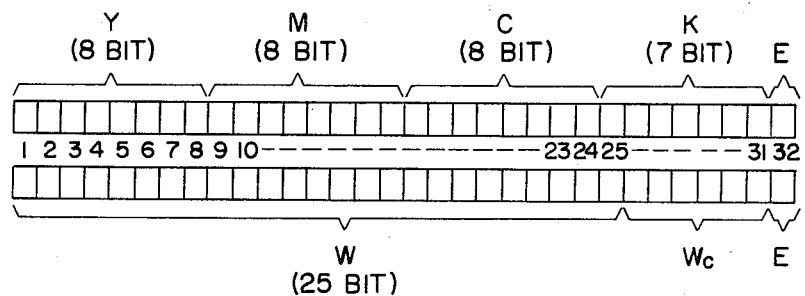
FIG. 4 illustrates data formats of picture signals and character signals respectively originating from said picture and said document.

FIG. 4 shows data formats of each of the picture signals and each of the character signals respectively written on the addresses of said memory 21. In this example of data formats, the picture signal allotted to one address comprises picture signals Y, M, C each of 8 bits length, another partial signal K of 7 bits length and the discrimination signal E of 1 bit length. These are arranged in this order and their symbols Y, M, C and K have the same meanings as defined hereinbefore. The character signal also allotted to one address comprises, on the other hand, a principal part W of 25 bits length, the color designate signal $W_c$ of 6 bits length as well as the discrimination signal E of 1 bit length. The color designate signal $W_c$ may be of a length smaller than 6 bits or may be substituted by such a signal that determines the area ratio of printed portion to unprinted portion (i.e. dot gradation ratio) in each of small halftone dots. In the above case, one bit for the discrimination signal is located within and at the tail end of the space for signal K which would otherwise occupy 8 bits. Such reduction will not substantially affect the graduation accuracy of said signals K because they correspond to those usually utilized in black plate making process.

Another timing circuit 12' located on the recording section generates and sends a series of read command pulses $g_4$ to the memory 21. According to these pulses, the picture signals and the character signals both having the formats of 32 bits length are read and supplied to a separation circuit 22. By means of the discrimination signal E contained in the above signals, the circuit 22 separates the picture signals comprising the parts Y, M, C and K from the character signals comprising the parts W and $W_c$. Thus the separated picture signals are sent to a halftone dot generation circuit 23 whilst the principal parts W of the character signals are fed to another latch 24. This latch 24 is adapted to rearrange each of the character signals of 25 bits length into five sets of basic character signals, each of the sets having a word length of 5 bits and being thereafter sent to a character control circuit 25 as described hereinafter. The color designate signals $W_c$ are also fed to the circuit 25 provided with switching elements which afford a selection of color that is to be given to characters in produced reproductions. The color may be cyan (C), magenta (M), yellow (Y) or any blend thereof.

The halftone dot circuit 23 converts the partial picture signals Y, M, C and K respectively into halftone picture signals Y', M', C' and K' in response to the control pulses $g_5$ given thereto from the timing circuit 12'. These halftone signals Y' etc. are sequentially aligned in the principal scan direction in a manner as disclosed in the Japanese Patent Gazette Sho. No. 52-18601 in the name of the applicant of this invention. Thus, the aligned signals Y' etc. will then control the aforementioned exposure head 17 so as to record an image on the film 14 carried by the drum 15 in the manner of color separation, namely resolving the original color into the C, M, Y and K and reintegrating same. Further details concerning such a direct reproduction of halftone images from the signals having a continuous graduation are referred to the applicant's other Japanese Patent Gazette Sho. No. 52-33523 or Patent Application Sho. No. 56-55841.

The latch 24 rearranges each of the character signals W into a final character signal comprising sequential units each having a length of 5 bits. Clock pulses $g_6$ from the timing circuit 12' cause the latch to output these rearranged character signals to the control circuit 25 in the same pitch as shown in FIGS. 2 and 3 for the picture element pitch $P_2$ of characters.

Another rotary encoder 13' is, as shown in FIG. 1, also provided to be driven by the shaft of said drum 15 so as to generate synchronous pulses $g_o'$, the latter thereby causing the circuit 12' to produce the foregoing various pulses $g_4$, $g_5$ and $g_6$.

Figure 5:
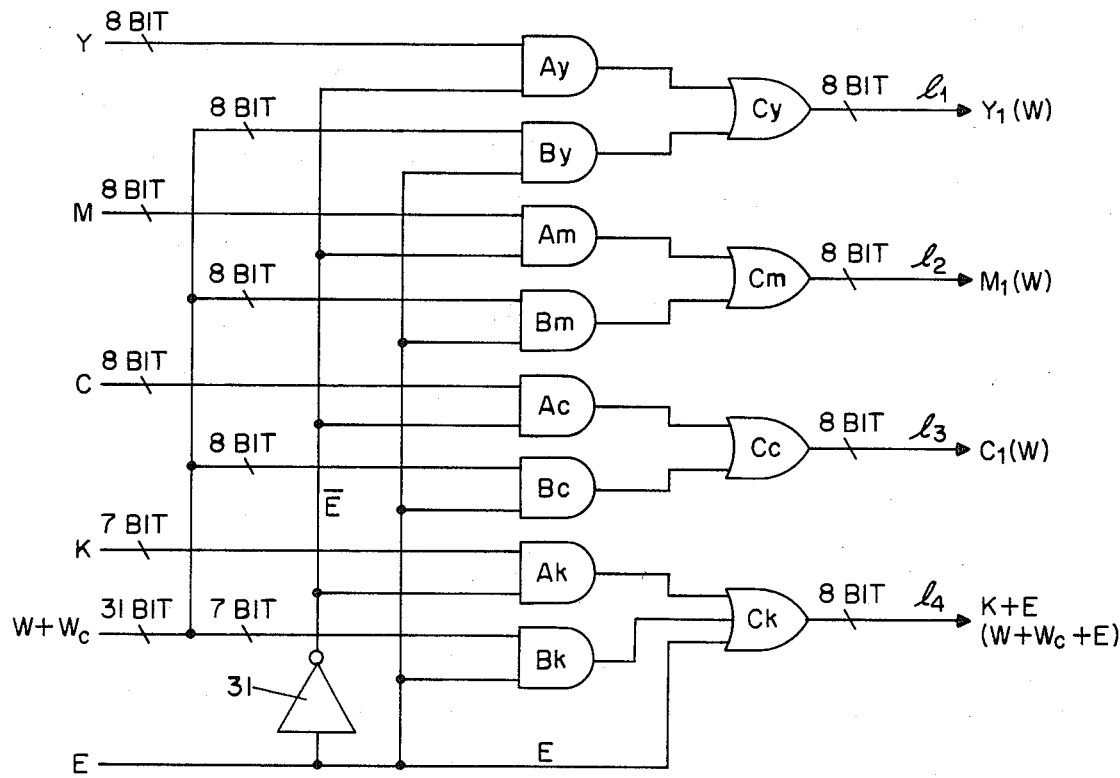
FIG. 5 illustrates an example of a priority processing circuit for the character.

FIG. 5 illustrates an example of the character priority processing circuit 19 in which an invertor 31 converts the discrimination signal E into an inverted signal $\overline{E}$. This signal is then fed to AND-gates Ay, Am, Ac and Ak connected in parallel with each other while the non-inverted signal $\overline{E}$ being given to the other AND-gates By, Bm, Bc and Bk. It will now be seen that the picture signals Y, M, C and K are respectively generated onto output lines $l_1$ to $l_4$ via the gates Ay, Am, Ac and Ak through OR-gates Cy, Cm, Cc and Ck, respectively, when the discrimination signal E is at its "0" level, namely any character signal is not supplied to the preference circuit. On the other hand, all the said picture signals Y, M, C and K will be interrupted by the AND-gates Ay, Am, Ac and Ak, and not to advance therethrough when the signal E is at its "1" level which means that a certain character signal is entering this preference circuit.

The main portions W of character signal as well as the color designate signal $W_c$ added thereto will be generated in parallel from the AND-gates By, Bm, Bc and Bk via said OR-gates Cy, Cm, Cc, and, Ck also onto said output lines $l_1$ to $l_4$, respectively, in the case where the discrimination signal E is at its "1" level, whereas they will be interrupted by said AND-gates By etc. if the signal E is at "0" level.

As indicated on the right-hand side of FIG. 5, the discrimination signal E of one bit length is added to the picture signal K of 7 bits length so as to constitute an integrated signal "K+E" of 8 bits length which is then supplied to the line $l_4$. Conversely, the other picture signals Y, M and C maintain their length of 8 bits unchanged during the foregoing character preferring process in which they are input data or output data.

The character signal W of 25 bits is divided into three groups of 8 bits and a remaining one bit whereby the former are respectively given to the output lines $l_1$ to $l_3$ while the latter being added to the color designate signal $W_c$ together with the discrimination signal E so that they form a synthesized data also of 8 bits length to be fed onto the remaining output line l₄.

Figure 6:
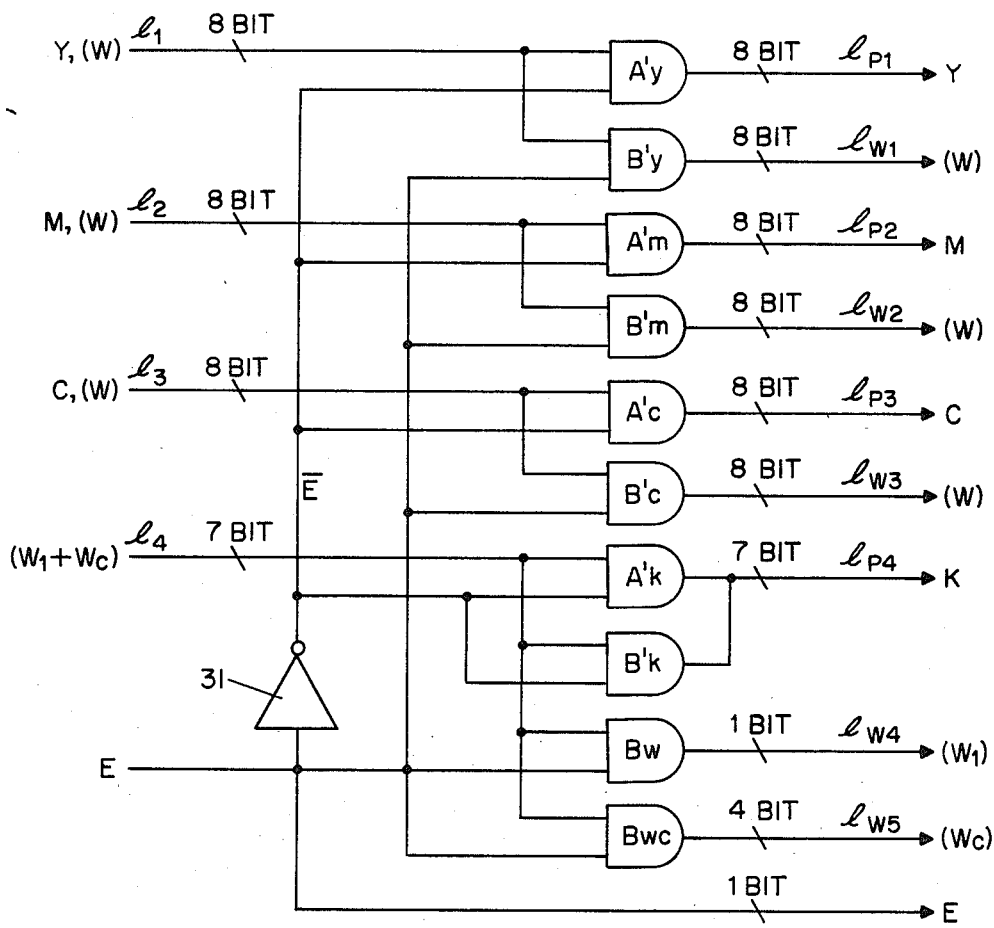
FIG. 6 illustrates an example of a signal separation circuit.

FIG. 6 shows an example of the separation circuit 22 which is so constructed as to cause the lines $l_1$ to $l_4$ to respectively diverge into branch lines $lp_1$ and $lw_1$, $lp_2$ and $lw_2$, $lp_3$ and $lw_3$, and $lp_4$, $lw_4$ and $lw_5$. The branch lines $lp_1$ to $lp_4$ serve to transmit the picture signals Y, M, C and K whereas the other branch lines $lw_1$ to $lw_4$ serve to transmit the character signal portions W while the remaining branch $lw_5$ thereby serving to transmit the color designate signal $W_c$. For this purpose, plural AND-gates A'y, A'm, A'c, A'k B'y, B'm, B'c, B'k, Bw and $Bw_c$ are provided in the circuit 22.

The discrimination signal E previously from the transmission line l₄ is now given to the gates A'y, A'm, A'c and A'k for the picture signals after it has been converted by another inventor 31 into an inverted signal $\bar{E}$ while the non-inverted discrimination signal E per se being given to the other AND-gates B'y, B'm, B'c, B'k, Bw and $Bw_c$ for the character signal.

It will now be apparent that the discrimination signal E at its "0" level energized the gates A'y, A'm, A'c and A'k to respectively output the picture signals Y, M, C and K to lines $lp_1$ to $lp_4$ while keeping deenergized the other gates B'y, B'm, B'c, B'k, Bw and $Bw_c$. On the other hand, when the signal E is at its "1" level, namely when the character signal is entering this separation circuit, the above two groups of AND-gates will reverse their state so as to output the character signal portions W onto the branch lines $lw_1$ to $lw_4$ thereby causing the color designate signal $W_c$ to advance on the line $lw_5$.

Figure 7:
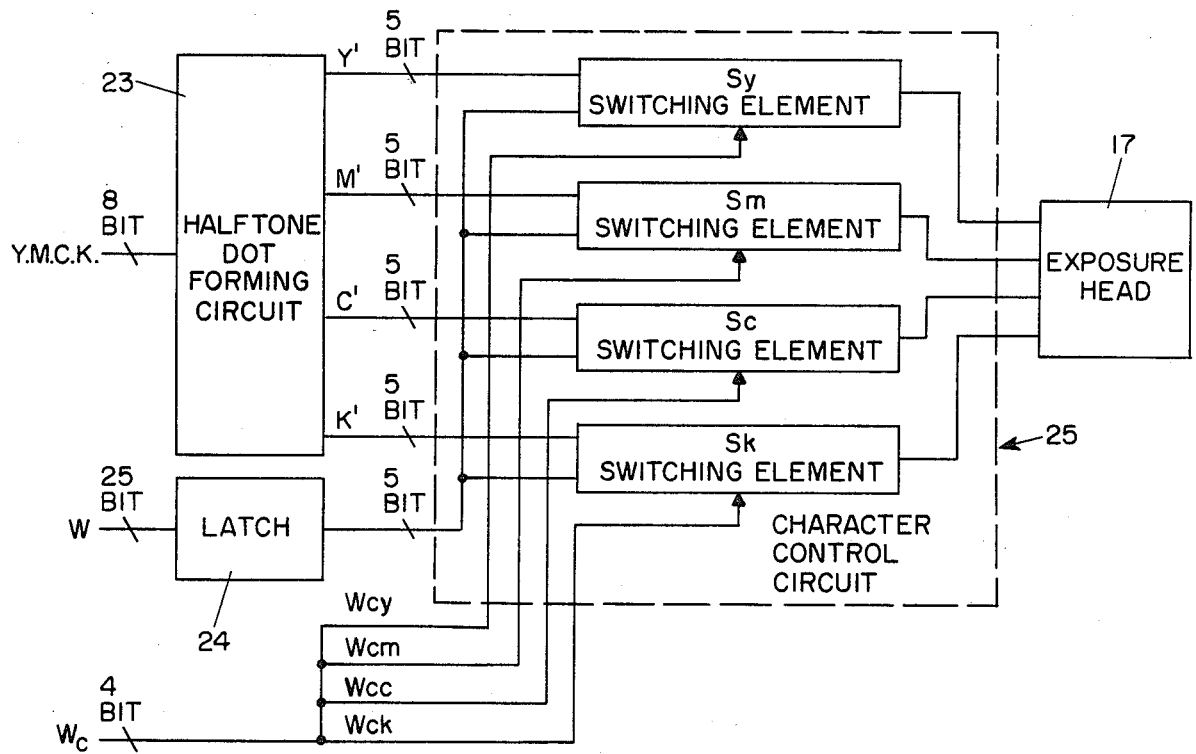
FIG. 7 illustrates an example of a character control circuit.

FIG. 7 illustrates an example of the character control circuit 25 having a structure such that the halftone picture signals Y', M', C' and K' are put in the halftone dot forming circuit 23 into the exposure head 17 in accordance with predetermined timings, respectively. The four partial character signals W of 5 bits length that are serially divided by the latch 24 from one integral character signal of 25 bits length are respectively fed via switching elements Sy, Sm, Sc and Sk to the exposure head 17.

Said switching elements are selectively turned on to color the character images that are to be recorded on the film. In case that, for example, only the branched signal Wcy of the designate signal $W_c$ is at high level "1" with the other branched signals Wcm, Wcc and Wck kept at low level "0", the character signal W will be given to the exposure head only when the yellow picture signal Y' is fed to said head 17. Hence, the recorded characters are colored to yellow. If the branched signals Wcy and Wcm are at their level "1" with the other signals Wcc and Wck at level "0", the recorded characters will become red that is a color when the yellow ink is mixed with the magenta ink.

The color designate signal Wc exemplified in FIG. 7 has a length of 4 bits. This length is however not limited to 4 bits but may be increased to for instance 6 bits if necessary as is the case where the color separation should be conducted into six colors inclusive of two special colors besides the above four colors C, M, Y and K.

Although the aforedescribed character signals are binary in their nature, they can be processed to produce halftone screening of the character document, with any suitable dot gradation ratio described hereinbefore.

Figure 8:
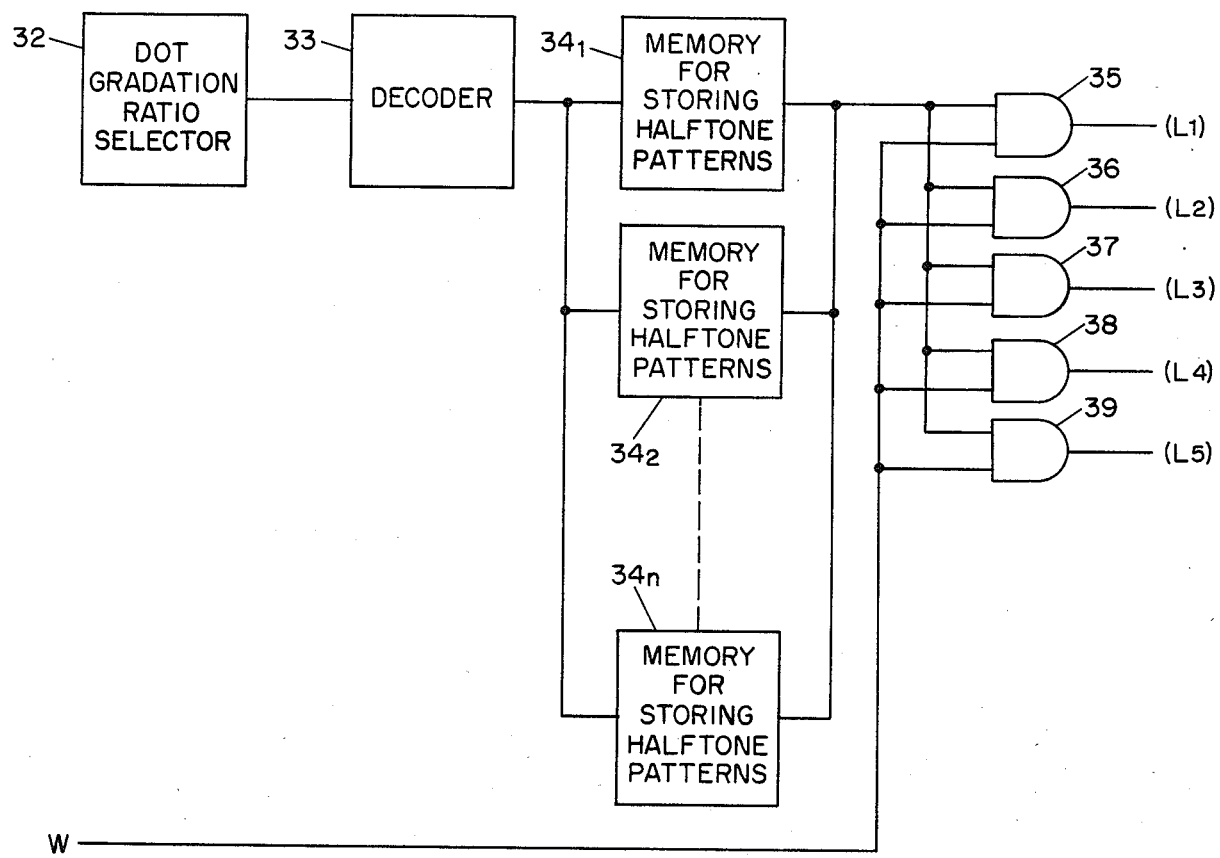
FIG. 8 illustrates an example of a further circuit adapted to modify the character signals into halftone signals.
Figure 9:
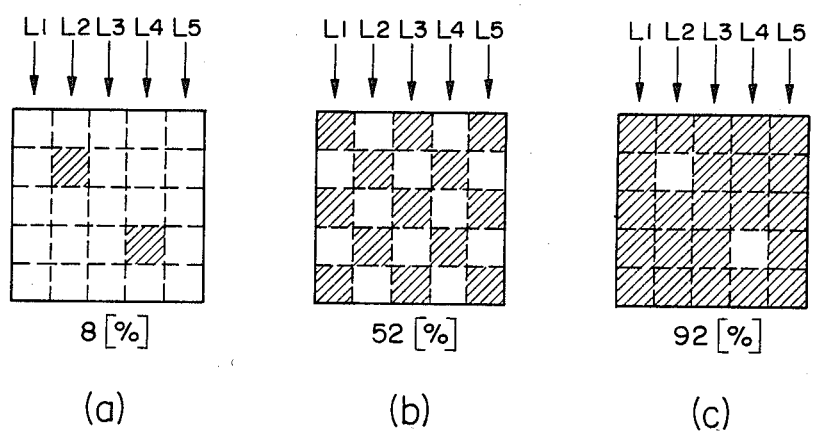
FIGS. 9A to 9C show some examples of dot gradation ratios with regard to a single halftone dot.

FIG. 8 shows an example of a circuit which is adapted to produce such halftone screened characters and is optionally incorporated into the system in place of the coloring devices shown in FIG. 1. A dot gradation ratio selector 32 will be operated by for instance 5-bits signal to vary said ratio at an interval of 4%. The numeral 33 indicates a decoder for decoding the dot gradation ratio signal. Memories $34_1$ to $34_n$ are adapted to store halftone patterns, some of them being illustrated in FIGS. 9A to 9C and each having said ratio different from one another. The numerals 35 to 39 indicate AND-gates that are connected in parallel to each other to respectively receive one of said halftone patterns in accordance with a selected dot gradation ratio set on the selector 32 and thereafter sent to the decoder 33. As will be seen from FIGS. 8 and 9A to 9C, five bits constituting each set of halftone signals are read out of one of said memories sequentially and in parallel with each other so as to be respectively fed to one of input terminals of said gates 35 to 39. The other input terminals of said gates are connected with the character output lines leading from the control circuit 25 shown in FIG. 7. Thus, the halftone signals of one-bit length will respectively be transmitted from said gates 35 to 39 to the exposure beams of light $L_1$, $L_2$, $L_3$, $L_4$ and $L_5$ only when the characters on the character document is being scanned. Finally, colored halftone screening of the characters are produced on the film.

The present invention is also applicable to a process intended to synthesize a composite image from ruled lines and original pictures. Here is also utilized in scanning the ruled lines as well as in processing the thus obtained data a picture element which, when multiplied, corresponds to a single picture element utilized for the original pictures. A resolving power with regard to fine edges or corners of such ruled lines is thus remarkably higher than that given by the known method in which some kinds of masks are used.

Although a parallel processing is exemplified in the foregoing embodiment, it can be modified to a system adapted to process the picture data and the character data partly in a sequential or serial mode. For example, the two kinds of data may be stored respectively in separate areas of a memory disc and called therefrom into a layout station comprising a CPU (central processing unit), a monitor device such as a color CRT (cathode ray tube display), a digitizer tablet and so forth. The layout station will synthesize an integral image by means of said two kinds of data in accordance with a predetermined layout, and then write it on a predetermined area of a further memory disc whereupon the written image signals are read therefrom to record a reproduction. The invented principle can also be applied to such a modified system in the event that the thus read signals which have been processed already according to the desirable layout would then be charged to the separation circuit 22 as shown in FIG. 1 and described above. It is noted that in such a case the character signals can alternately be produced by referring to a digital font utilized in the photo-type composing system employing a computer. Despite the above-mentioned modifications, the higher resolving power applied to the character signals will never be affected at all because said character signals and the picture signals are both arranged in data formats of the same word length each having the discrimination bit.

What is claimed is:

1. A method of scanning an original picture and a character document and recording a synthesized image on a photosensitive material, comprising the steps of:

photoelectrically scanning at the same time the original picture and the character document in a sub-scanning direction when the original picture and character document are in a predetermined positional relationship with respect to each other and are synchronized in a main scanning direction;

producing in parallel from said photoelectric scanning graphic signals corresponding to picture elements from the original picture and character signals corresponding to picture elements the document, wherein a matrix of multiple picture elements from the document positionally corresponds to one picture element of the original picture;

organizing graphic signals corresponding to one picture element of the original picture into a block of data in accordance with a first data format;

organizing character signals corresponding to the matrix of multiple picture elements into a block of data in accordance with a second data format having the same length as the first data format;

providing a discrimination bit in each of the data formats to indicate whether a block of data is graphic data or character data;

storing blocks of graphic data in a first portion of a memory device, and blocks of character data in a second portion of the memory device, said storage step including the substeps of monitoring the discrimination bits of parallel blocks of data to be stored, and preventing storage of any block of graphic data when a block of character data is simultaneously generated in parallel therewith, whereby of the two simultaneously generated blocks only the block of character data is stored in said memory device; and reading stored graphic and character data from the memory device for subsequent combination in accordance with a predetermined lay-out to create the synthesized image.

2. A method of scanning an original picture and a character document and recording a synthesized image on a photosensitive material, comprising the steps of:

photoelectrically scanning at the same time the original picture and the character document in a sub-scanning direction when the original picture and character document are in a predetermined positional relationship with respect to each other and are synchronized in a main scanning direction;

producing in parallel from said photoelectric scanning graphic signals corresponding to picture elements from the original picture and character signals corresponding to picture elements from the document, wherein a matrix of multiple picture elements from the document positionally corresponds to one picture element of the original picture;

organizing graphic signals corresponding to one picture element of the original picture into a block of data in accordance with a first data format;

organizing character signals corresponding to the matrix of multiple picture elements into a block of data in accordance with a second data format having the same length as the first data format;

providing a discrimination signal to indicate whether a block of data is graphic data or character data;

presenting blocks of data simultaneously produced from graphic signals and character signals in parallel to a circuit means for priority processing which prevents graphic data from passing therethrough to a memory device whenever the discrimination signal indicates character data is also present, thereby allowing the character data to have priority in passing therethrough to the memory device; and operating plural exposure beams of light in accordance with the data which has passed through the priority processing means to the memory device to record the synthesized image on the photosensitive material, wherein the plural exposure beams reproduce plural picture elements from the character document simultaneously and reproduce individual picture elements from the original picture through subdivision of each such element in a matrix of multiple fine elements.

3. The method as set forth in claim 2 further comprising the step of:

adding a color designate signal to each of the blocks of character data without increasing the length of the second data format, and selectively operating the exposure beams in accordance with the color designate signal added to each block of character data to produce characters on the photosensitive material of the color specified by the color designate signals.

4. The method as set forth in claim 2 further comprising the steps of:

adding a halftone screening signal to each of the blocks of character data without increasing the length of the second data format;

accessing halftone patterns of predetermined dot gradation ratios previously stored in a second memory device in accordance with the halftone screening signal stored in each block of character data; and operating the exposure beams in accordance with the accessed halftone patterns to produce halftone images of the characters from the character document on the photosensitive material.

5. The method as set forth in claim 2, wherein the photoelectric scanning step includes the steps of:

providing a beam of light emanating from the character document; and receiving the beam of light from the character document with a plurality of photosensors aligned in the subscanning direction, wherein each of photosensors receive a portion of said light.

6. The method as set forth in claim 2 further comprising the step of:

providing a discrimination bit in each of the data formats to indicate whether a block of data is graphic data or character data.

7. The method as set forth in claim 6 further comprising the step of:

setting the discrimination bit of each data block containing character data in accordance with the state of the discrimination signal associated therewith.

* * * * *

UNITED STATES PATENT AND TRADEMARK OFFICE
CERTIFICATE OF CORRECTION

PATENT NO. : 4,553,172

DATED : November 12, 1985

INVENTOR(S) : Yamada et al.

It is certified that error appears in the above-identified patent and that said Letters Patent is hereby corrected as shown below:

First page, second column, insert --52-18601 Japan--

Signed and Sealed this

Eighteenth Day of March 1986

[SEAL]

Attest:

DONALD J. QUIGG

Attesting Officer

Commissioner of Patents and Trademarks